April 25, 1961 T. C. BURNETTE, JR 2,981,780
DEFERRED ACTION TYPE BATTERY WITH INVOLUTE PLATES
Filed Sept. 13, 1950 2 Sheets-Sheet 1
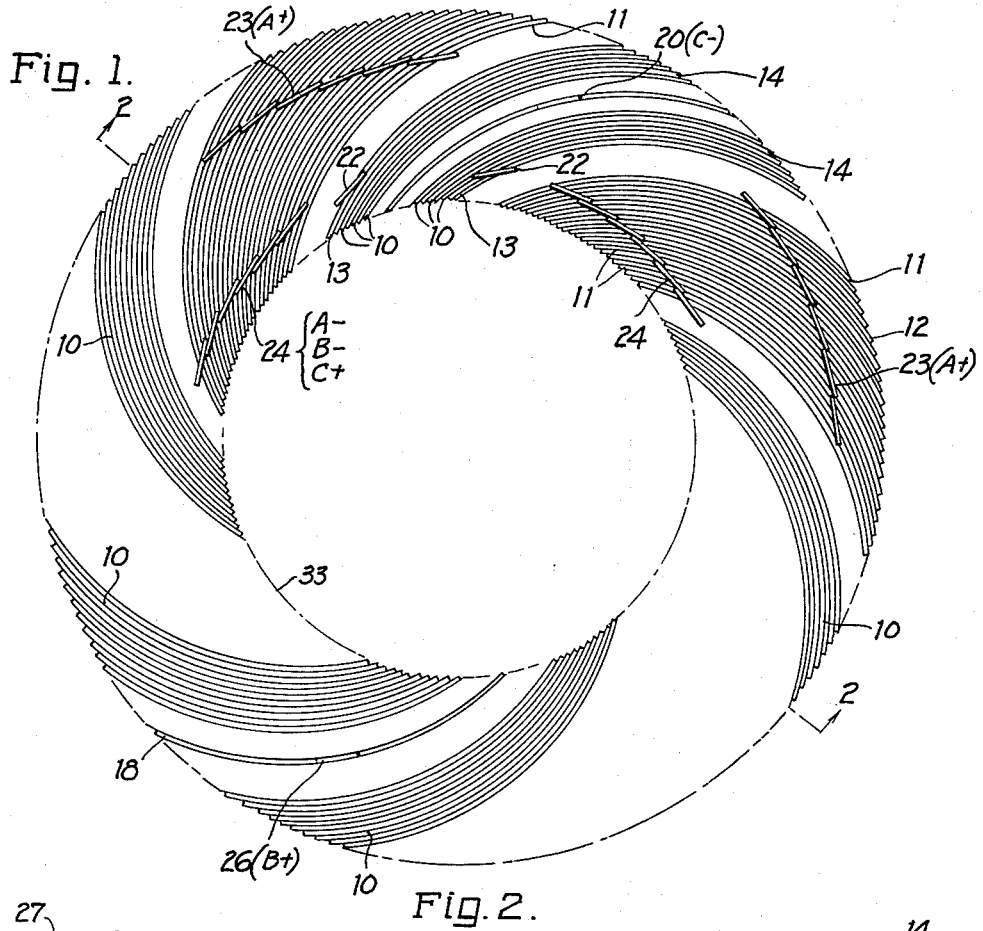
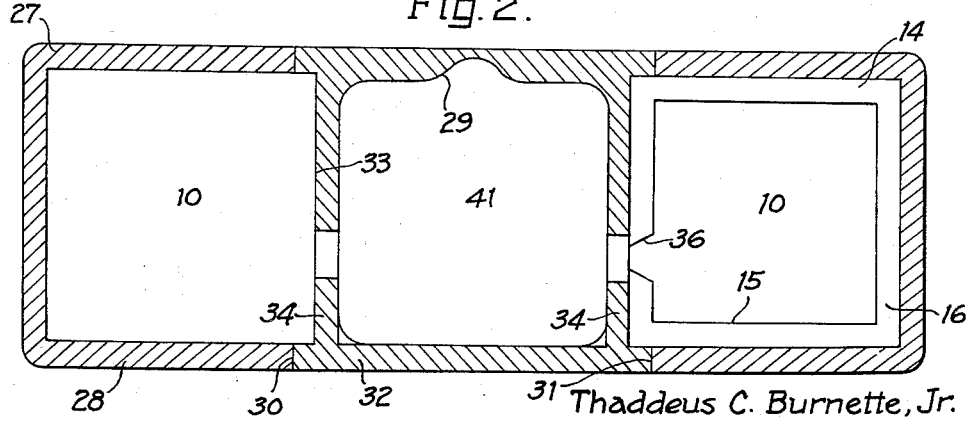
Thaddeus C. Burnette, Jr.
Inventor
By G. D. O'Brien
Attorney April 25, 1961     T. C. BURNETTE, JR     2,981,780
DEFERRED ACTION TYPE BATTERY WITH INVOLUTE PLATES
Filed Sept. 13, 1950     2 Sheets-Sheet 2
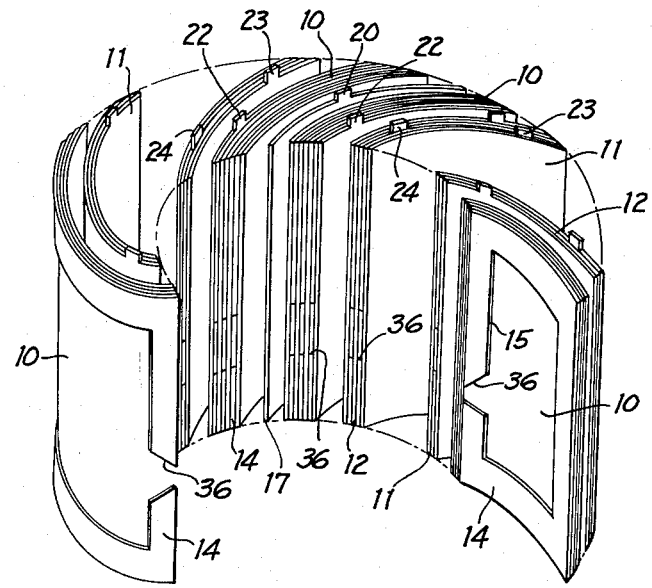
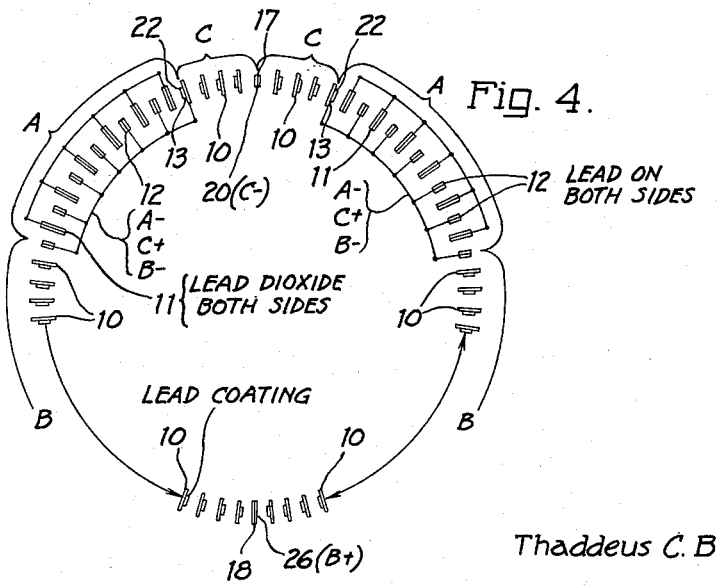
Thaddeus C. Burnette, Jr.
Inventor

United States Patent Office 2,981,780
Patented Apr. 25, 1961

2,981,780

DEFERRED ACTION TYPE BATTERY WITH INVOLUTE PLATES

Thaddeus C. Burnette, Jr., Kingsport, Tenn., assignor, by mesne assignments, to the United States of America as represented by the Secretary of the Navy Filed Sept. 13, 1950, Ser. No. 184,535

9 Claims. (Cl. 136—90)

This invention relates to small, deferred action type batteries in which the cells are inert and electrolyte is not applied to the electrodes until immediately before use.

Deferred action type batteries heretofore manufactured most extensively were cylindrical in shape with spaced horizontal semiannular and annular plates arranged concentrically in a ring-shaped stack. A rupturable glass ampule containing electrolyte was disposed within the axial compartment in the stack and mounted above a rupturing surface upon a flexible disk or other means rigid enough to keep the ampule away from the surface during normal handling, but flexible enough under the influence of inertia or setback, e.g., when an artillery projectile containing the battery was fired, to allow the ampule to collide with the rupturing surface. Stresses produced in the ampule by the impact shattered the glass, and electrolyte was caused to flow radially into the cells through filling slots provided along the inner periphery of some of the plates. In order to fill all the cells with electrolyte to a uniform level, aligned small diameter leveling holes were provided in the annular and semiannular plates. The column of electrolyte in the aligned leveling holes caused internal short circuiting of the cells which greatly decreased cell life. Local action at the leveling holes resulted in wasteful and rapid solution of the electrode material and depletion of electrolyte available to enter into electrochemical reaction, which materially reduced the watt-second capacity of the cells below their intrinsic capabilities. To minimize the rapid discharge of the cells due to this internal short circuiting, it was for various reasons necessary to utilize an electrolyte whose reaction product with the electrodes tends to precipitate. This is disadvantageous in that batteries using such electrolytes have less output per unit volume than batteries utilizing electrolytes which produce soluble reaction products. Furthermore, it appears that the flow of electrolyte through the leveling holes may often result in excessive noise voltage in the battery output. The points of greatest potential difference in such batteries were separated vertically by only a single thick insulator and horizontally by only a vertical barrier of insulation between the semicylindrical halves of the battery. Consequently, leakage of electrolyte across the thick insulator or across the barrier of insulation was not uncommon, and it appears that noise voltage in the battery output due to this leakage may at times be sufficiently high to cause premature detonation of the electric fuzes in which the batteries were contained.

It is an object of the invention to provide a deferred action type battery which occupies less than half the volume but has more than twice the watt-second capacity of batteries heretofore manufactured.

It is also an object of the invention to provide a deferred action type battery which obviates the necessity of using leveling holes in the battery plates.

A further object of the invention is to provide a deferred action type battery in which no intercommunication between cells is possible, thus eliminating wasteful depletion of the electrolyte available to enter into electrochemical reaction due to internal short circuiting of the cells as encountered in deferred action type batteries heretofore manufactured.

A still further object is to provide a deferred action type battery in which a maximum of the inherent chemical energy of the galvanic system is transformed into electrical energy.

Another object is to provide a deferred action type battery which obviates the necessity of an electrolyte whose reaction product with the electrodes tends to precipitate and allows the use of an electrolyte which produces a soluble reaction product and is capable of producing a much greater output per unit plate area.

A further object of the invention is to provide an annular deferred action type battery in which all the cells are filled directly from filling slots located along the periphery of the axial compartment in the battery. It is a still further object to provide a deferred action type battery for use in projectiles in which the battery plates are adapted to scoop up the electrolyte in order to fill the cells in a minimum of time.

It is an object of the preferred embodiment of the invention to provide an annular deferred action type battery in which the points of greatest potential difference in the battery are located approximately diametrically opposite from each other in order to provide maximum breakdown resistance and to minimize noise voltage in the battery output due to leakage of electrolyte.

It is also an object of the invention to provide an annular deferred action type battery in which the number of battery cells and the ratio of exposed electrode surface area to volume of electrolyte can be varied as desired without change in the overall physical dimensions of the battery. An object of one embodiment of the invention is to provide a deferred action type battery in which the number of cells can be varied within limits without change in the size of the battery plates or in the overall dimensions of the battery.

The aforementioned shortcomings of the prior art are overcome and the objects of the present invention are attained by constructing the battery of thin parallel plates extending outward substantially along an involute of a circle. In the manufacture of the preferred embodiment of the invention flat rectangular plates are initially positioned vertically within an annular compartment, and the resulting "ring" of plates is then forced through a tapered sleeve to gradually decrease the outside diameter of the "ring" while maintaining the inner diameter constant, thereby causing the plates to assume an involute curve.

Other objects and advantages of the invention will be apparent from the following description taken in connection with the accompanying drawings which form a part hereof.

In the drawings:

Fig. 1 is a top view of an annular ring of battery plates embodying the invention;

Fig. 2 is a vertical sectional view taken on line 2—2 of Fig. 1 after an ampule has been assembled within the axial compartment and a jacket of plastic has been formed around the annular ring of plates shown in Fig. 1;

Fig. 3 is a perspective view of part of the battery illustrated in Fig. 1; and

Fig. 4 is a schematic view diagraming the location of electrode materials used on the plates and the manner in which the connection lugs on the plates are commoned to form the terminals of the deferred action battery illustrated in Fig. 1.

In the construction of the preferred embodiment of deferred action type battery illustrated in the drawings, thin flat battery plates with nonconductive separators positioned between the plates are originally arranged vertically within an annular volume to form a ring of plates. The plates are blanked from thin, corrosion resisting metal such as stainless steel, and electrode materials are coated on both sides of the plates as disclosed in the application of Linwood P. Morrison and James W. Henry, Serial No. 120,053.

The battery of the preferred embodiment of the invention is made up of a low voltage (grid bias C) section, a low voltage, high amperage (filament voltage A) section and a high (anode B) voltage section. In order to provide a large battery plate area and yet maintain the overall dimensions as small as possible, the battery is made up of two identical approximately semicylindrical halves, and the cells of the corresponding sections in the two halves are connected in parallel. The two identical units of the battery are herein referred to as "semicylindrical halves" although, because the plates assume an involute curve instead of being radial, this is not strictly accurate. Thus, each battery section is made up of two paralleled sets of battery plates, e.g., the high voltage (anode B) section is composed of two sets of battery plates physically separated from each other with the individual cells formed by the plates connected in potential series and with the two sets of plates connected in parallel. The plates of the low voltage (grid bias C) and the high (anode B) voltage sections are connected in potential series, while the plates of the low voltage, high amperage (filament voltage A) section are paralleled to supply the heavy filament current drain encountered in use. Consequently, the plates 10 of the low voltage C and high voltage B sections are coated on opposite sides with electropositive and electronegative electrode materials, while in the low voltage, high amperage A section plates 11 coated on both sides with an electropositive electrode material, e.g., lead dioxide, are alternated between plates 12 having electronegative electrode material, e.g., lead, on both sides thereof. The plates are flat and square when blanked, but in assembly an initial bend is imparted to the plates to facilitate the operation of imparting an involute curve to the plates. Square separators 14 of suitable insulating material, such as a highly sized wood paper, are positioned between the plates. A square aperture 15 is provided in the separators 14, leaving only a thin wall 16 around the perimeter of the separators 14 and exposing a large area of the plates to electrochemical action. To prevent the separation of the plates of the final battery unit, the separators 14 are coated or impregnated with a suitable adhesive before assembly between the plates. It has been found that excellent bonding is obtained by the use of synthetic thermosetting resin adhesives, particularly phenol resin adhesives, e.g., a phenol acetal resin such as is available commercially. During assembly, the ring of battery plates is forced through a tapered sleeve which gradually reduces the outside diameter of the ring while maintaining the inner diameter constant. As the ring of plates is gradually reduced in outside diameter, the plates naturally assume the desired involute shape. In the preferred embodiment of the invention the battery plates do not begin at the base circle of the involute curve; the inner circumference of the annular battery intersects the involute at a point beyond the base circle and each plate extends substantially along an involute of the base circle all the way to the outer circumference of the battery. The ring of plates is forced from the tapered sleeve into a final annular fixture which holds both the inner and outer diameter of the ring to the desired dimension while heat is applied to cure the adhesive and thus bond the plates together.

It will be readily observed that this arrangement of battery plates allows a highly versatile and flexible construction. Depending upon the diameter of the base circle from which the involute is generated and upon the distance from this base circle along the involute that the inner periphery of the battery intersects the involute, it is possible to vary the number of cells in the battery and the ratio of electrode area to volume of electrolyte over a wide range without changing the overall dimensions of the battery. It is thus possible to obtain the best combination of volume of electrolyte to exposed electrode area for maximum battery performance without changing the overall dimensions of the battery. It will also be noted that, while maintaining the size of battery plate constant, it is possible to vary the outside diameter of the battery, the number of cells, and the volume of electrolyte by merely changing the diameter of the base circle from which the involute is generated. Unlike the horizontal circular plate battery that was most extensively constructed heretofore, the height of the battery embodying the features of the invention can be varied by merely changing the height of the plates without changing the number of cells or the thickness of the materials used. This feature is particularly advantageous in deferred action type batteries for use in projectiles in which the outside diameter of the batteries and other fuze components is fixed by the size of the projectile casing, and reduction in physical size can best be taken advantage of if the dimensional variations are in an axial direction.

Unlike a battery with radial vertical plates in which the distance between plates increases with distance from the axis of battery, the plates of the battery of the invention are equidistant apart at all points. In a battery with radial plates, the wedge-shaped volume between plates must either be filled with an excess amount of electrolyte or with an insulating material that adds nothing to the battery. The result in either case is an inefficient use of available space. The battery of the invention uses separators of uniform thickness between the plates and results in uniform distribution of electrolyte over the plate area. The result is a maximum cell area per unit volume of battery.

As best shown in Figs. 1 and 4, the battery of the preferred embodiment of the invention consists of two paralleled, identical, semicylindrical battery halves with only the battery plate 17 which is formed with the cathode (C—) terminal 20 of the low voltage C section and the plate 18 which is formed with the anode (B+) terminal 26 of the high voltage B section common to the two halves. Each semicylindrical half consists of a set of low voltage (grid bias C) plates, a set of low voltage, high amperage (filament voltage A) plates, and a set of high (anode B) voltage plates. Each set of plates in one semicylindrical half is connected in parallel with an identical set of plates in the second half to form the corresponding section of the battery, e.g., the low voltage C section comprises a set of four cells connected in potential series in one semicylindrical half connected in parallel with a second set of four cells connected in potential series and physically situated in the second half of the battery. A single plate 17 having electronegative (lead) coatings on both sides thereof is common to both sets of plates of the C section, each lead coating constituting the cathode of the first cell in the set of four serial C cells in one semicylindrical half. Three plates 10 and a fourth plate 13, having opposite sides electronegative and electropositive are located in potential series in a clockwise direction from the plate 17 with adjacent plates having electronegative (lead) and electropositive (lead dioxide) sides face-to-face to form a set of four series cells. Similarly, three plates 10 and a fourth plate 13, each having opposite sides electronegative and electropositive are located in potential series in a counterclockwise direction from the plate 17 with adjacent plates having electronegative and electropositive sides face-to-face to form a second set of four series cells. Separators 14 are positioned between adjacent plates. A connection lug 20 formed on the plate 17 forms the cathode (C—) terminal of the low voltage section, and connection lugs 22 are provided on the fourth plates 13 (both clockwise and counterclockwise from the plate 17) to form the anode (C+) terminal of the low voltage C section. In operation the anode (C+) terminal of the low voltage (grid bias C) section is customarily at ground potential and is commoned with the cathode (A— and B—) terminals of the low voltage, high amperage (filament voltage A) and the high (anode B) voltage sections.

The low voltage, high amperage (filament voltage A) section of the preferred embodiment of the invention comprises two paralleled sets of twelve cells, one set in each semicylindrical half, with the individual cells of each set also connected in parallel. To shorten the description and to facilitate the understanding of the drawings, only the sets of A and B plates in the semicylindrical half displaced clockwise from the (C—) plate 17 are described, it being understood that an identical set of plates is included in the half displaced counterclockwise from the (C—) plate 17. The electronegative (lead) side of the fourth plate 13 (which is also formed with the C+ terminal 22) forms the cathode of the first cell of the low voltage, high amperage A section. Six plates 11 having both sides electropositive alternate with six plates 12 having both sides electronegative to form twelve paralleled cells. Thus the fifth plate 11 clockwise from the (C—) plate 17 has electropositive (lead dioxide) coatings on both sides thereof; the sixth has electronegative (lead) coatings on both sides; etc. Separators 14 are positioned between adjacent plates. The connection lugs 24 extending upwardly from each plate 12 having both sides electronegative are nearer the axis of the battery than the connection lugs 23 extending upwardly from the plates 11 which are electropositive on both sides. The connection lugs 22 and 24 are conveniently joined to provide a commoned (A—, B—, C+) "ground" connection for the battery sections by imparting a slight twist to the lugs 22 and 24 with a pair of pliers to make them abutting and parallel, and then soldering the lugs 22 and 24 together. In a similar manner the connection lugs 23 are commoned to form the anode (A+) terminal of the low voltage, high amperage A section. Short wires can be conveniently soldered between the commoned (A—, B— and C+) "ground" connections and between the A+ terminals of the two sets of A plates in the two semicylindrical halves to form the A section of the battery.

The high (anode B) voltage section of the preferred embodiment of the invention is made up of two paralleled sets of cells, one set in each semicylindrical half, with the individual cells of each set connected in series. An electronegative coating on the A plate 12 that is displaced furthest clockwise from the C— plate 17 forms the cathode of the first cell of the set of B plates in the semicylindrical half displaced clockwise from the C— plate 17, and the connection lug 24 on this plate 12 is the cathode (B—) terminal which is commoned with the A— and C+ terminals as described hereinbefore. The seventeenth plate clockwise from the C— plate 17 has the electropositive side thereof facing an electronegative coating on this last A plate 12 to form the first cell of the set of B plates; the eighteenth plate 10 has the electropositive side thereof facing the electronegative side of the seventeenth plate to form the second B cell, etc. The remaining cells of this set of B plates are made up of plates 10 arranged in potential series with electropositive and electronegative sides face-to-face. While the number of cells in series can be varied to obtain the desired voltage, it has been found that 58 serial cells will furnish an output of approximately 95 volts even under heavy current drains. A plate 18 having both sides electropositive is provided with the anode (B+) terminal 26. An identical set of B plates is provided in the semicylindrical half displaced counterclockwise from the C— plate 17, and the last cell at the high potential end of each set of B plates has one side of the plate 18 as the anode thereof. Terminals may readily be located on any of the plates 10 to provide a potential source of any desired voltage, e.g., a terminal on the twenty-ninth plate 10 clockwise from the furthest clockwise plate 12 would provide a voltage top of approximately 47 volts. This voltage supply could readily be paralleled with a similar voltage tap in the semicylindrical half counterclockwise from the C— plate 17.

It will be readily apparent from the above description that the points of the battery having the greatest potential difference are separated by approximately the inner diameter of the battery. The potential in one set of high (anode B) voltage plates increases in a clockwise direction away from the commoned (A—, C+, B—) ground connection, while the potential of the second set of plates increases in a counterclockwise direction. The high voltage (B+) end of the B section is approximately in diametrically opposite relation from the commoned (A—, C+, B—) ground connection to provide maximum resistance to voltage breakdown. It will be observed that the necessity of using a barrier of insulation between halves of the battery and of using a thick insulator between battery sections to prevent leakage of electrolyte as was required in many deferred action type batteries heretofore manufactured, is obviated, and noise voltage in the battery output due to such leakage is minimized.

As described hereinbefore, after the ring of battery plates is forced through a tapered sleeve to impart the desired involute curve to the plates, the ring of plates is heated to cure the synthetic thermosetting resin adhesive and thus provide a bonding for the plates. After a liquid coating of vinyl resin cement is applied to the outer periphery of the ring of plates and allowed to dry, a jacket 27 of a suitable thermoplastic material, such as a copolymer of vinyl chloride and vinyl acetate, is molded around the outer periphery and partly down the inner periphery of the axial compartment 33 in the annular battery. An insert (not shown) is positioned within the axial compartment 33 during the jacketing operation to form a pocket 29 to receive a rupturable ampule 41 containing electrolyte and to prevent entry of softened plastic into the filling slots 36 in the inner wall of the separators 14. The lower wall 28 of the plastic jacket 27 does not extend all the way inwardly to the inner periphery of the ring of plates, thus forming an annular recess 30 to receive the outwardly extending circular flange 31 of a cup-shaped cap 32 which is inserted within the axial compartment 33 in the ring of plates. The cap 32 is also molded of a suitable thermoplastic material, such as a copolymer of vinyl chloride and vinyl acetate, and is bonded to the jacket 27 by a suitable vinyl resin cement. The side walls 34 of the cup-shaped cap 32 extend upward almost to the height of the filling slots 36 provided in the inner wall of the separators 14. In use, the battery is positioned in a projectile fuze above a rigid member, and when a projectile containing the fuze is fired, the stresses produced in the ampule 41 by the forces of setback shatter the glass to free the electrolyte. The filling slots 36 are above the level to which the shattered glass normally accumulates, thus preventing the shattered particles from interfering with the filling of the cells. Because electrolyte is driven by the force of inertia to the bottom of axial compartment 33, the filling slots 36 are located nearer to the bottom than to the top of the battery.

In other embodiments of the invention a metallic insert is molded within the plastic cap 32 to provide a rigid rupturing surface against which this ampule 41 can collide upon setback, and a flexible disk-shaped washer is conventionally positioned above this insert to support the ampule. The dish-shaped washer is rigid enough to keep the ampule 41 away from the metal insert during normal handling but flexible enough under the influence of inertia or setback; e.g., when an artillery projectile containing the battery is fired, to allow the ampule 41 to collide with and rupture against the metallic insert.

As a projectile rotates, the frictional forces between the battery and the electrolyte cause the electrolyte to spin. As the projectile accelerates, the electrolyte also increases in angular velocity, but it only slowly attains the speed of rotation of the projectile and the battery. This differential in angular velocity is utilized to promote filling of the cells in a minimum of time. Maximum rate of fill with minimum turbulence is attained by curving the cells outward in a direction opposite to that of the projectile rotation to take advantage of the involute curve of the plates that follows closely the natural flow pattern of the electrolyte in filling a cell. The battery and projectile spin faster than the electrolyte. The edges of the battery plates at the filling slots 36 act in the manner of the rotating buckets of a steam turbine to scoop up the electrolyte. If eccentricity of spin results in flooding the cells in a portion of the battery before all the cells are filled, the cells that are flooded will not take in any additional electrolyte while moving relative to the electrolyte, while the plates of the "starved" cells will scoop up the electrolyte. To aid in the simultaneous and uniform filling of every cell, all the filling slots 36 are located at the same level so that all cells are under an equal head at all times. It will be noted that the filling slots 36 are provided directly in the separators 14 and not in the plates as was customary in deferred action type batteries heretofore manufactured. With filling slots in the plates, the electrolyte had to flow radially until it impinged against the bottom of a filling slot and thence parallel to the axis of the battery into the cells, thus creating turbulence which is a potential cause of undesired noise voltage. With the slots directly in the separators, the electrolyte flows directly into the cells without obstruction.

In a slightly modified embodiment of the invention the separators 14 are of a compressible rag paper instead of the highly sized wood paper as utilized in the preferred embodiment of the invention. It has been found convenient to use a rag paper of approximately 0.0115 inch thickness which, in the operation of squeezing the plates of the battery depicted in the drawings into the desired involute shape, are compressed to approximately 0.0065 inch in the final battery. This provides a highly flexible construction which allows a limited number of cells to be inserted or removed from the battery as desired without changing the size of the plates or the overall physical dimensions of the battery. Dimensional variations are absorbed by the fibers of the rag paper separators, the extent to which the separators are compressed varying with the number of cells included in the battery.

It should be readily apparent from the foregoing description and the drawings that a deferred action type battery has been described which has a much greater watt-second capacity per unit volume than batteries heretofore manufactured. No intercommunication between cells is permitted, thus preventing internal short circuiting of the cells and making it possible to utilize an electrolyte which produces a soluble reaction product and is inherently capable of producing a much greater output per unit volume than an electrolyte whose reaction product with the electrodes tends to precipitate which it has hitherto been necessary to utilize in deferred action batteries constructed with leveling holes in the plates. The height of the battery embodying the features of the invention has been decreased to approximately fifty percent of the height of the annular stack of horizontal plates included in the deferred action type batteries heretofore manufactured most extensively, and yet the watt-second capacity of the battery of the invention has been more than doubled.

As described hereinbefore, it is not necessary to limit the plates in the battery sections to the number described in the preferred embodiment of the invention, nor to limit the shape of the plates and the insulators, nor the number of battery sections to the embodiment described. The number of plates can be varied as desired by changing the diameter of the base circle from which the involute curve is generated. Any number of cells can be included in the A, B, or C sections to obtain the voltage and watt-second capacity desired, or the entire battery can be made up of one section with the plates in series or in parallel as desired. For example, a slightly modified embodiment of the invention consists of a single set of battery plates 10 in serial arrangement with electronegative and electropositive sides face-to-face to provide a 180 volt annular deferred action type battery.

While the embodiment of the present invention as herein described constitutes a preferred form, it is understood that other forms might be adopted, all within the scope of the claims which follow.

Having thus described my invention, what I claim as new and desire to secure by Letters Patent of the United States is:

1. A deferred action type battery of annular shape comprising a plurality of cells electrically connected together, each cell comprising a thin conducting battery plate having a coating of electropositive electrode material on one side thereof, a second thin conducting battery plate adjacent said first plate and having a coating of electronegative electrode material on the side thereof that is facing said electropositive coating, and a thin, non-conducting apertured separator disposed between said electronegative and electropositive sides, each of said plates and separators extending outward from the inner circumference of said annular battery substantially along an involute of a circle concentric with said inner circumference and subtending a central angle of less than 360°.

2. A deferred action type battery comprising a plurality of thin rectangular conducting battery plates coated with electropositive and electronegative electrode materials and a plurality of thin, apertured, rectangular nonconducting separators, said plates and said separators being arranged in an annulus with the battery plates and separators extending outward from the inner circumference of the annulus substantially along an involute of a circle concentric with said inner circumference with a single separator between adjacent battery plates.

3. An annular battery of the deferred action type comprising a plurality of cells established between coatings of electropositive and electronegative electrode materials on thin rectangular conducting battery plates which extend outward from the inner circumference of the annular battery substantially along an involute of a circle concentric with said inner circumference with thin, rectangular, apertured nonconducting separators disposed between adjacent plates, each separator being formed with a slot leading from the inner periphery of the annular battery into the aperture in said separator to provide an orifice for the introduction of electrolyte into the volume formed by said aperture between adjacent plates.

4. An annular battery of the deferred action type in which cells formed between electronegative and electropositive sides of conducting battery plates are inert until use, comprising a low voltage section made up of a plurality of thin, rectangular battery plates arranged in potential series and extending outward from the inner circumference of the annular battery substantially along an involute of a base circle concentric with said inner circumference, a high voltage section also made up of a plurality of thin, rectangular battery plates in potential series extending outward from said inner circumference substantially along an involute of said base circle, and a low voltage, high amperage section disposed between the low voltage and the high voltage sections made up of a plurality of thin, rectangular battery plates having both sides electropositive and an equal number of battery plates having both sides electronegative alternated with said plates having both sides electropositive with the battery plates extending outward from said inner circumference substantially along an involute of said base circle with successive plates having electronegative and electropositive sides face-to-face.

5. An annular battery comprising two identical approximately semiannular sets of battery plates with the individual cells established between the plates of each set connected in potential series and with the low potential ends and the high potential ends of the sets commoned to connect the two sets of serial cells in parallel with the electric potential in each set increasing symmetrically from the commoned low potential ends so that the points of greatest potential difference in the battery are separated by the inner diameter thereof.

6. An annular battery of the deferred action type consisting of two identical approximately semiannular halves each comprising a plurality of battery plates having opposite sides electronegative and electropositive connected in potential series, said halves being disposed with the low potential ends thereof adjacent so that the electric potential increases in one half in a clockwise direction and in the second half in a counterclockwise direction, a battery plate having both sides electronegative disposed between the low potential ends of the halves, and a battery plate having both sides electropositive disposed between the high potential ends of the halves to connect the cells in the two halves in parallel with the electric potential increasing symmetrically in both halves from the plate having both sides electronegative whereby the points of greatest potential difference in the battery are separated by the inner diameter thereof.

7. An annular battery of the deferred action type comprising two identical, approximately semiannular halves constructed of thin, rectangular, conducting battery plates extending outward from the inner circumference of the annular battery substantially along an involute of a circle concentric with and of smaller diameter than said inner circumference with thin, rectangular, nonconducting apertured separators between successive plates, each half comprising a low voltage section at one end thereof made up of a plurality of said battery plates having opposite sides electronegative and electropositive with successive plates having electronegative and electropositive sides face-to-face, a high voltage section at the opposite end thereof also made up of a plurality of said battery plates having opposite sides electronegative and electropositive with successive plates having electronegative and electropositive sides face-to-face and a low voltage, high amperage section disposed between the low voltage and the high voltage sections made up of a number of said battery plates having both sides electronegative and an equal number of said battery plates having both sides electropositive with successive plates having electropositive and electronegative sides face-to-face, said halves being arranged with the low voltage sections in each half adjacent with one of said battery plates having both sides electronegative disposed between said low voltage sections, and with the high voltage sections in each half adjacent with one of said battery plates having both sides electropositive disposed between said high voltage sections.

8. A battery in accordance with claim 7 in which the electronegative side of the plate at the positive end of the low voltage section is the cathode of the first cell of the low voltage, high amperage section.

9. A battery in accordance with claim 7 in which an electronegative side of the last plate of the low voltage, high amperage section is the cathode of the first cell at the negative end of the high voltage section.

References Cited in the file of this patent

UNITED STATES PATENTS

| | | |
|---|---|---|
| 247,935 | Maloney et al. | Oct. 4, 1881 |
| 305,022 | Shaw | Sept. 9, 1884 |
| 1,269,778 | Becker | June 18, 1918 |
| 2,534,056 | Pitt | Dec. 12, 1950 |